United States Patent
Zimmerman et al.

(10) Patent No.: US 8,424,286 B2
(45) Date of Patent: Apr. 23, 2013

(54) VEHICLE RELOCATABLE EXHAUST SYSTEM COMPONENTS

(75) Inventors: Bret Alan Zimmerman, Grosse Pointe Farms, MI (US); Dwayne Pollitt, Novi, MI (US); John Paul Bogema, Flat Rock, MI (US); Christopher Oberski, Plymouth, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 495 days.

(21) Appl. No.: 12/635,171

(22) Filed: Dec. 10, 2009

(65) Prior Publication Data

US 2011/0061373 A1 Mar. 17, 2011

Related U.S. Application Data

(60) Provisional application No. 61/241,508, filed on Sep. 11, 2009.

(51) Int. Cl.
*F01N 3/00* (2006.01)
*F01N 3/10* (2006.01)

(52) U.S. Cl.
USPC .......... 60/274; 60/295; 60/301; 60/303

(58) Field of Classification Search .......... 60/274, 60/295, 301, 303
See application file for complete search history.

(56) References Cited

U.S. PATENT DOCUMENTS

| | | | |
|---|---|---|---|
| 6,408,619 B1 * | 6/2002 | Wissler et al. | 60/286 |
| 6,637,196 B1 * | 10/2003 | Tost | 60/286 |
| 6,912,846 B2 * | 7/2005 | Huber et al. | 60/286 |
| 6,941,746 B2 * | 9/2005 | Tarabulski et al. | 60/286 |
| 7,775,036 B2 * | 8/2010 | Barcin | 60/286 |
| 2002/0020169 A1 * | 2/2002 | Ketcher | 60/285 |
| 2004/0025498 A1 * | 2/2004 | Lambert et al. | 60/286 |
| 2007/0273494 A1 * | 11/2007 | Dittrich et al. | 340/461 |
| 2008/0110158 A1 * | 5/2008 | Esaka | 60/286 |
| 2009/0008175 A1 * | 1/2009 | Donaldson | 180/209 |
| 2009/0293457 A1 * | 12/2009 | Grichnik et al. | 60/286 |

* cited by examiner

*Primary Examiner* — Kenneth Bomberg
*Assistant Examiner* — Dapinder Singh
(74) *Attorney, Agent, or Firm* — Julia Voutyras; Alleman Hall McCoy Russell & Tuttle LLP (57) ABSTRACT

Modification of reductant (e.g., diesel exhaust fluid, DEF) tank location, for example during vehicle up-fitting may result in less than optimal operation of the DEF system due to inaccurate DEF system calibration. In one example approach, the above issue can be at least partially addressed by adjusting control system parameters for system control and diagnostics based on an input indicative of, or any modification to, the DEF tank location. In this way, DEF tank location flexibility is maintained, while also maintaining emission control and diagnostic accuracy.

15 Claims, 5 Drawing Sheets

VEHICLE RELOCATABLE EXHAUST SYSTEM COMPONENTS

CROSS REFERENCE TO PARENT APPLICATION

The present application claims priority to U.S. Provisional Patent Application No. 61/241,508, filed Sep. 11, 2009, titled "Vehicle Relocatable Exhaust System Components," the entire contents of each of which are incorporated herein by reference.

BACKGROUND AND SUMMARY

Engine exhaust systems may use various injections of a reductant to assist in the reaction of various exhaust emissions. In one example, the reductant may include Diesel Exhaust Fluid (DEF), which may include a urea-based chemical reactant used in selective catalytic reduction (SCR) to reduce emissions of oxides of nitrogen in the exhaust of diesel vehicles. DEF may be stored in a storage vessel, such as a tank, on-board a vehicle.

The inventors herein have recognized that in the case of incomplete vehicles that are delivered to vehicle "up-fitters" for additional modifications (e.g., ambulance, tow truck, etc.), it may be desirable to provide flexibility in the location of the reductant storage. For example, it may be desirable to provide a vehicle chassis, powertrain, and exhaust system to the up-fitters, yet with various components, such as the reductant storage vessel configured to be mountable at various locations. For example, some up-fitters may modify or add various vehicle components, and to most efficiently do so, the up-fitters may wish to relocate the reductant storage vessel, along with other components, such as a vehicle fuel tank.

However, the inventors herein have also recognized that providing such flexibility can result in degraded emission control. For example, if the reductant tank is relocated further away from an injection location, thus resulting in longer reductant delivery lines, the increased flow resistance may adversely affect reductant delivery, diagnostics, and/or various other operations. Furthermore, a longer line may result in increased heater wiring, and thus increased heater resistance. Again, such modifications may affect heater control, heater diagnostics, etc.

In one example approach, at least some of the above issues can be at least partially addressed by a method of configuring a controller of a vehicle with an exhaust system including a reductant storage vessel, comprising: receiving vehicle exhaust system configuration information; and adjusting exhaust system operating parameters based on the received exhaust system configuration information.

In this way, it may be possible to accommodate relocation of various exhaust system components, such as a reductant (e.g., DEF) storage vessel, as well as related effects of such relocation, such as variation in reductant (e.g., DEF) heater resistance.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
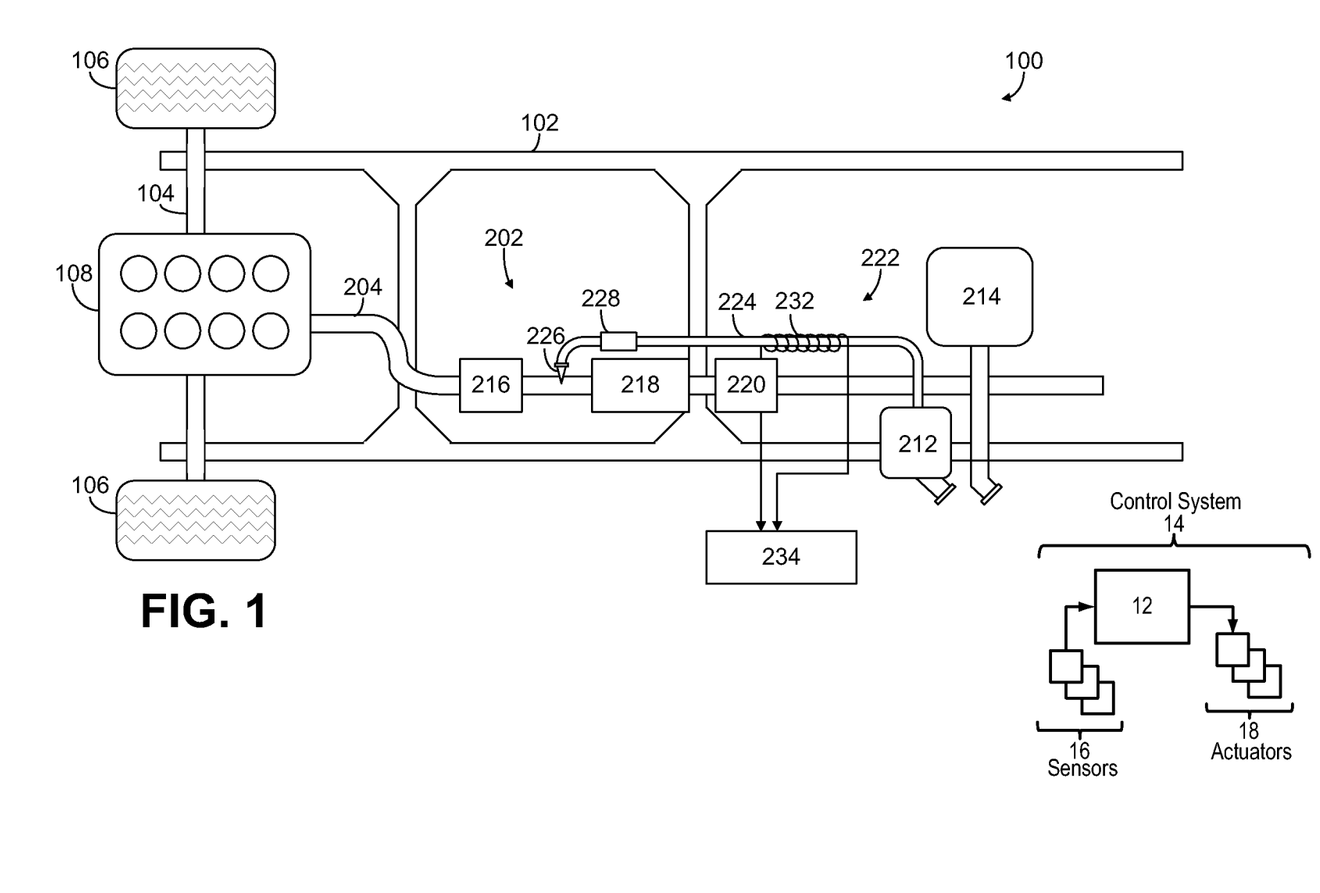
FIG. 1 shows a schematic depiction of a partially-assembled vehicle.
Figure 2:
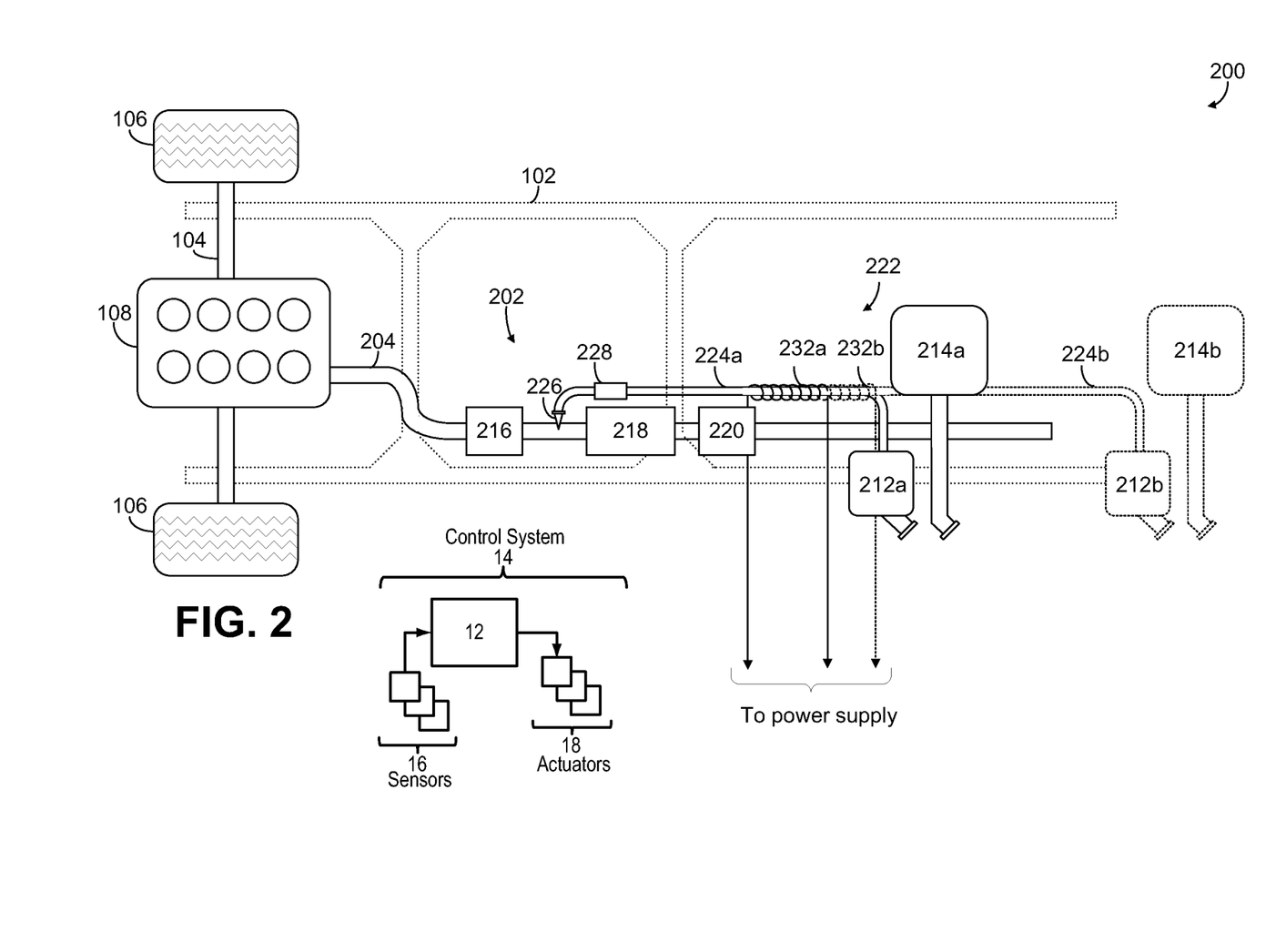
FIG. 2 shows a schematic depiction of a vehicle with a first and a second reductant tank location.
Figure 3:
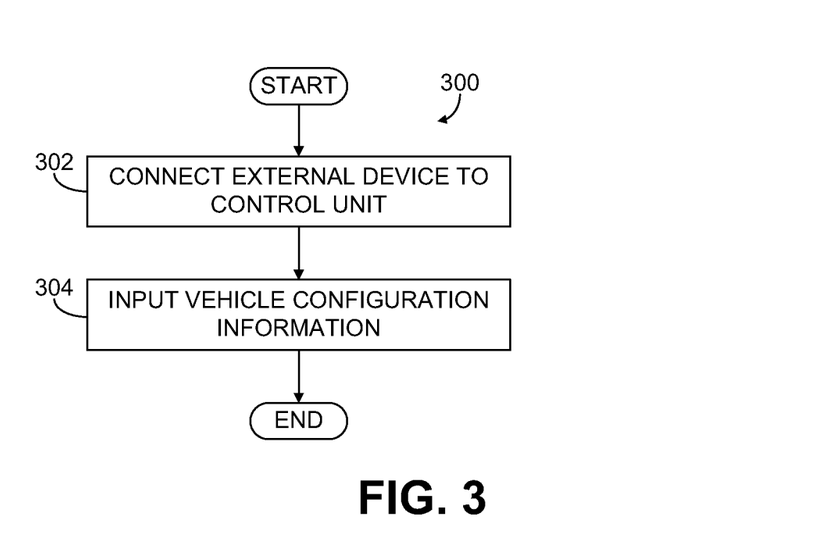
FIG. 3 shows an example routine for inputting vehicle configuration information into a control system of the vehicle.
Figure 4:
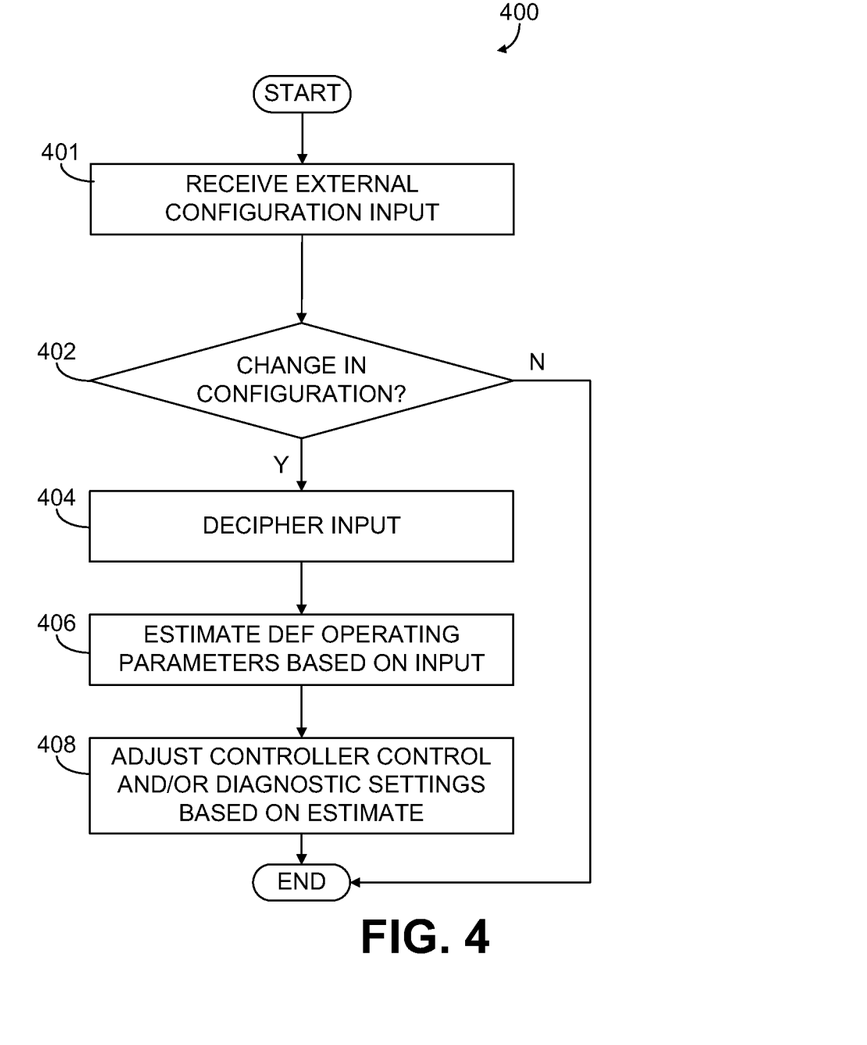
FIG. 4 shows an example routine for adjusting exhaust system operation based on the vehicle configuration input.
Figure 5:
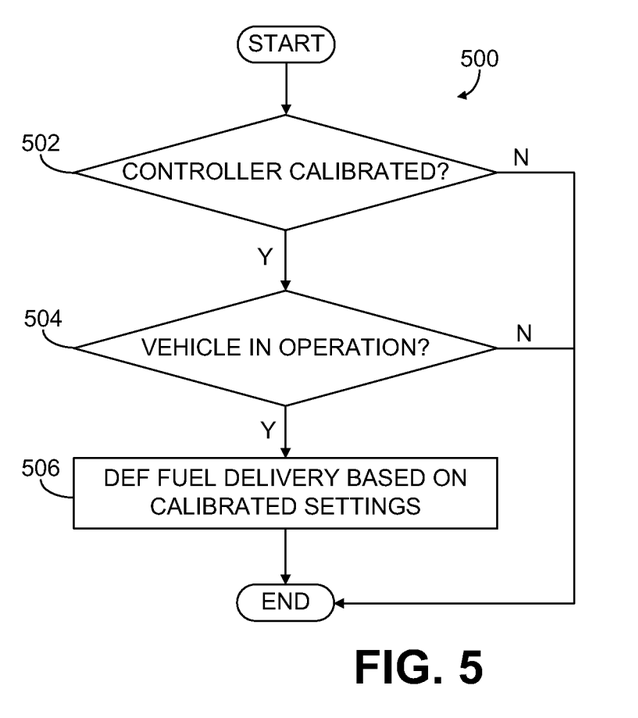
FIG. 5 shows an example routine for carrying out DEF delivery following controller calibration.

The following description relates to vehicles, systems, and methods for adjusting operation based on external vehicle configuration information or data. For example, partially assembled, (e.g., incomplete) vehicles such as shown in the example of FIG. 1 may be delivered to vehicle up-fitters for additional modifications, e.g., for ambulances, tow trucks, etc. As shown in FIG. 2, vehicle up-fitters may modify the vehicle (e.g., by adding shovels, beds, compartments, cranes, etc.) resulting in the relocation of various components including fuel and DEF tanks, for example. The up-fitters may then input new vehicle configuration information or data, indicative of a new location of the DEF tank and/or line lengths of a DEF delivery line, to the on-board vehicle control system, as shown in the example of FIG. 3. The control system may then re-calibrate various parameters, control algorithms, diagnostic algorithms, etc., based on the input information to maintain accurate control of DEF delivery and to maintain accurate exhaust/emission diagnostics, as shown in FIGS. 4-5. For example, in FIG. 4, an onboard controller may configure DEF system operating parameters based on the input vehicle configuration information. Then, in FIG. 5, once the vehicle controller is calibrated to a particular vehicle configuration, the DEF system may be operated based on the adjusted calibration settings. In this way, variations in DEF delivery (e.g., response delays, flow resistance, etc.) and/or variations in DEF heating (e.g., heater resistance, etc.) may be compensated for by the control system.

Turning to FIG. 1, a schematic example of a pre-assembled partially complete vehicle is shown generally at 100. Vehicle 100 may be received from a manufacturer by a vehicle up-fitter, for example, for further manufacture. Vehicle 100 may include a chassis 102, an axle 104 with wheels 106, an engine 108, and a control system 14. The engine 108 may be a diesel engine in one example. Further, although not shown, vehicle 100 may further include a transmission, cab, or other components.

Control system 14 is shown receiving information from a plurality of sensors 16 (various examples of which are described herein) and sending control signals to a plurality of actuators 18 (various examples of which are described herein). As one example, sensors 16 may include exhaust gas sensors, such as NOx, O2, and various other sensors coupled in the engine exhaust. Other sensors such as pressure and temperature sensors, may be coupled to various locations in the vehicle. As another example, the actuators may include fuel injectors (not shown), reductant injectors, reductant line heaters, and various others as described herein. The control system 14 may include a controller 12. The controller may receive input data from the various sensors, process the input data, and trigger the actuators in response to the processed input data based on instructions or code programmed or encoded therein corresponding to one or more routines. In one example, controller may be a microcomputer, including microprocessor unit, input/output ports, an electronic storage medium for executable programs and calibration values, random access memory, keep alive memory, and a data bus.

An example control routine is described herein with reference to FIGS. 4-5 for controlling and/or diagnosing one or more components in the engine exhaust system. Further controller 12 may include an interface configured to receive external input, such as vehicle configuration information including location of a reductant storage tank, length of a reductant delivery line, reductant line heater parameters, combinations thereof, or others. Further a single code may be used to account for a combination of relocated components by the up-fitter, or multiple codes may be used. In one example, a wheelbase code may be selected, representative of the effective wheelbase corresponding to a new reductant tank location, reductant delivery line length, etc.

The partially assembled vehicle 100 may further include, or be delivered with, an exhaust system 202. The exhaust system may include an exhaust conduit 204 leading to one or more exhaust aftertreatment devices (e.g., devices 216, 218, and 220), as well as a reductant delivery and storage system, such as DEF system 222. Portions of the exhaust system, such as conduit 204, may be coupled to an exhaust manifold of the engine to that exhaust gas is supplied from the exhaust manifold to the conduit 204.

The exhaust aftertreatment devices may be disposed in various orders and/or combinations along exhaust conduit 204. For example, a diesel oxidation catalyst (DOC) 216 may be followed downstream by an SCR catalyst 218. SCR catalyst 218 may be followed downstream by a diesel particulate filter (DPF) 220. It should be understood that the emission control devices of the exhaust system 202 shown in the FIGS. 1 and 2 are exemplary in nature. Various other emission control devices and configurations may be included in the exhaust system 202. For example, exhaust system 202 may include an SCR followed by a DPF only. In another example, the exhaust system 202 may only include an SCR. In still another example, a DPF may be located upstream of the SCR, or a combined DPF/SCR catalyst may be used, for example.

The exhaust system 202 may further include a reductant delivery and/or storage system, such as DEF system 222. As noted herein, the DEF may be a liquid reductant, such as a urea, stored in a storage vessel, such as a storage tank. In one example, the DEF system 222 may include DEF tank 212 for onboard DEF storage, a DEF delivery line 224 that couples the DEF tank to exhaust conduit 204 via an injector at or upstream of SCR 218. The DEF tank 212 may be of various forms, and may include a fill neck and corresponding cap and/or cover door in the vehicle body as illustrated in FIGS. 1 and 2.

DEF system 222 may also include a DEF injector 226 in line 224 which injects DEF into the exhaust upstream of the SCR. DEF injector 226 may be used to control the timing and amount of DEF injections, via the control system 14. DEF system 222 may further include a DEF pump 228. DEF pump 228 may be used to pressurize and deliver DEF into the line 224. DEF system 222 may further include a DEF line heater 232 which heats DEF line 224. For example, the DEF line heater may warm the DEF fluid on the way to the DEF pump at low temperatures in order to maintain a DEF fluid viscosity. The heater may be a resistive heater, or various other configurations. The heater may be coupled to a power supply 234, such as a battery system, and may be enabled and controlled via one or more switches via control system 14, for example.

Vehicle 100 may also include a fuel tank 214 that may be positioned proximate to the DEF tank 212. Furthermore, additional vehicle components not included in the pre-assembled vehicle may be provided by the manufacturer for assembly by the up-fitter.

As noted herein, various components of the vehicle system may have flexible locations, allowing up-fitters to relocate and modify component locations within the vehicle to accommodate the vehicle end use. For example, an ambulance may have different packaging constraints, a different wheelbase, etc., than a tow truck. In particular, components of the exhaust system may be positioned at different locations for different vehicle end uses. For example, vehicle 100 may be delivered with various exhaust system components configured for flexible positioning so that the up-fitter can vary the lengths of the exhaust conduit and/or the positioning of exhaust aftertreatment components. In one example, the DEF storage tank may be located in different positions by the up-fitter, thus changing the length of the DEF delivery line, and the size/resistance/length of the line heater. FIG. 2 illustrates examples of modifications made to vehicle 100.

Specifically, FIG. 2 shows a modified vehicle indicated generally at 200. The modified vehicle 100 is shown with two example exhaust system configurations, along with different positions of various components. In this example, components that have different positions are denoted with an "a" or "b" in combination with the label number. In a first configuration, a DEF tank 212a and fuel tank 214a are shown at first locations (which may be behind or in front of a rear axle, not shown). A first heater 232a is shown having a first resistance. For example, the positioning of DEF tank 212a and fuel tank 214a may be chosen by a vehicle up-fitter so that various other components particular to a given vehicle application may be installed on the chassis behind the rear axle.

FIG. 2 also shows a second configuration with components positioned closer to a rear of vehicle 200 than the first configuration. In this example, a DEF tank 212b and fuel tank 214b are shown at second locations (again, either behind or in front of the rear axle). Further, a second (longer) heater 232b having a second, different, resistance is shown corresponding to the longer line 224b. For example, the positioning of DEF tank 212b and fuel tank 214b may be chosen by a vehicle up-fitter so that various other components particular to a given vehicle application may be installed on the chassis. The positioning of DEF tank 212b closer to the rear of vehicle 200 than DEF tank 212a results in a longer DEF line length in this example.

While two example vehicle configurations are represented in FIG. 2, various other modifications may be used. For example, a plurality of DEF tank locations may be available, not only flexible in the for-aft direction of the vehicle, but also between the left and right sides of the vehicle (e.g., between driver's side and passenger's side). As another example, rather than different heater lengths or resistance, various other heater parameters may be present, such as different numbers of heater coils, different wire thickness, etc.

As noted above, the variation in placement or configuration of DEF system components may affect various operating parameters of DEF system 222, and thus the control system may adjust algorithms, operating parameters, etc., based on such variations. For example, a longer DEF line may require a greater amount of fluid pressure supplied by the DEF pump to deliver sufficient DEF to the exhaust conduit. In another example, the amount of power supplied to a DEF line heater may be adjusted to depend on the length of the DEF line and the resistance of the line heater. In still another example, operation of the DEF pump and/or injector may be adjusted based on the location of the pump along the DEF line. In yet another example, adjustment to one or more of the DEF system operating parameters may be based on the location of injector 226 within the exhaust conduit 204.

In one particular example, the control system may include various routines that adjust such operations based on input indicative of the position of components, such as the position of the DEF storage tank, size/resistance of the line heater, length of the delivery line, etc. The input may be a single code, where various of the above parameters are correlated to DEF tank location and/or line length. Alternatively, a plurality of codes or parameters may be input, each indicative of a particular location of a particular exhaust system component.

As such, controller 12 may be calibrated (or re-calibrated) based on external input provided by the vehicle up-fitter. The vehicle up-fitter may utilize various approaches to provide such input, including an external device that temporarily or permanently interfaces with control system 14. The external device may be a device configured to communicate vehicle configuration information to controller 12. For example, the device may be a computing device where a user, e.g., an up-fitter, inputs one or more codes indicating vehicle configuration information, such as an effective wheelbase, to be communicated to controller 12 for processing. In another example, the external device may be a computing device which processes a plurality of vehicle configuration information data and inputs DEF operating parameters into controller 12.

Further examples of system adjustments based on input information are described below herein with regard to FIGS. 3-5.

FIG. 3 shows an example method 300 for inputting vehicle configuration information into controller 12, which may be carried out by a vehicle up-fitter. At 302, a device, e.g., an external device from the vehicle, is connected to onboard controller 12 and communicates with controller 12. In one example, the external device may be temporarily coupled with the controller, such as in the case where the external device includes a digital processing system as well as a user interface. For example, the external device may include a keyboard to enable the up-fitter to enter vehicle configuration information, which is then transmitted to the controller via the connection. Alternatively, the external device may be a resistor, or other component, that is coupled in the control system 14 such that it remains in the system during operation of the vehicle.

At 304 in routine 300, vehicle configuration information is input into the onboard controller 12. For example the vehicle configuration information may comprise number or letter codes entered by the up-fitter, where the codes correspond to predetermined component configurations, sizes, and/or positions. In one approach, a predetermined code system may be provided to the up-fitter by the manufacturer of vehicle 100. Selected codes may correspond to various combinations of configurations. For example, a first code may correspond to having the DEF line length within a first, lower range; whereas a second code may correspond to having the DEF line within a second, higher range. As still another example, a first code may correspond to a first heater resistance, and a second code may correspond to a second, higher, heater resistance.

In another example, the different codes corresponding to different DEF tank locations, heater resistance, etc., may be different resistor values of a resistor coupled into the controller by the up-fitter. For example a resistor with a first resistance may correspond to a first DEF tank location, and a second resistor with a second resistance, or no resistor at all, may correspond to a second DEF tank location. Further, more than two codes may be used for a plurality of DEF tank locations, DEF deliver line lengths, DEF line heater resistances, etc.

In still another example, the vehicle configuration information may alternatively be lengths and/or positions of one or more exhaust system components. For example, the vehicle configuration information may be a numerical length in meters, or other units. As another example, the vehicle configuration information may be a numerical resistance of the heater in Ohms, or another unit. In still another example, the vehicle configuration information may include a plurality of codes and/or a plurality of position, length, size, or other such parameters.

Thus, the vehicle configuration information may be indicative of a variety of different types of information representing the location of exhaust system components, fuel components (e.g., fuel tank), and/or DEF system components.

FIG. 4 shows an example routine 400 for an onboard controller, such as controller 12, which processes the input vehicle configuration information in order to adjust system operation and/or diagnostics based on the input information.

First, at 401, the controller receives the external vehicle configuration input information or data. Next, at 402, the routine determines whether this input indicates a change in the vehicle configuration from a base configuration. For example, in the example where DEF tank location information is received, the routine may determine whether this input indicates a change in the location from a base, or default, position. Alternatively, or additionally, the routine may determine whether the input information is of an acceptable format to be interpreted by the controller, or the routine may determine if a connection with a valid external device was established, to thus reduce a potential for unauthorized input information.

If the answer to 402 is yes, the routine continues to 404. Otherwise, the routine ends. At 404, the routine deciphers the input. For example, the input information may be in the form of a code, e.g., a number or letter code representing vehicle configuration information. The controller may then translate, via predetermined correlations stored in the controller, or communicated to the controller via the external device, the input code into data usable by processing algorithms stored in the controller.

At 406, the controller processes the input data to estimate DEF and/or system operating parameters based on the decoded input vehicle configuration information. For example, algorithms and/or predetermined vehicle configuration maps may be stored in memory on the controller. The controller may then use the stored vehicle configuration maps together with the input vehicle configuration information to estimate DEF operating parameters. Then, at 408, settings of the controller may be adjusted based on the estimates of DEF operating parameters from 406. For example, the controller may store the DEF operating parameters in an electronic storage medium for use during vehicle operation.

As one example, controller 12 may adjust various actuators, such as the line heater, reductant injector, and/or combinations thereof, based on various sensed parameters such as engine speed, engine load, temperature, or combinations thereof. These adjustments may be based on algorithms with various calibration values, some of which may be calculated based on physical configuration parameters of the vehicle, exhaust system, etc. In this example, the calibration values may be altered based on the deciphered input codes. Further, control system feedback gains, limit values, and other parameters may also be adjusted based on the deciphered input codes. The calibration values, control gains, etc., may be controller parameters or settings that affect various exhaust system operations, such as exhaust gas temperature, exhaust flowrate, reductant injection amount, reductant injection timing, particulate filter regeneration temperature limits, and various others as described further herein with regard to FIG. 5.

As another example, controller 12 may adjust parameters in diagnosing functionality of various exhaust components, such as the SCR catalyst, the DEF storage tank integrity, DEF injection integrity, exhaust gas sensor integrity, etc. In one example, the routine may lower a threshold allowable heater current to the line heater based on an increased DEF delivery line length, (e.g., further rearward DEF tank location), or based on a longer DEF line heater, or others.

Turning now to FIG. 5, an example routine 500 is shown for adjusting various actuators, such as DEF injection timing, DEF pump operation, and others based on the adjusted controller settings of FIG. 4.

At 502, the routine checks whether or not the controller has been initially calibrated. For example, the controller may provide a warning message on an on-board display device in the vehicle to indicate that the up-fitted vehicle has not yet been calibrated with any base, or default configuration information, such as a base wheelbase, etc. If so, the routine continues to 504.

At 504, the routine determines whether the vehicle is in operation in order to initiate DEF system control routines. When the vehicle is in operation at 504, the routine proceeds to 506. At 506, the routine carries out DEF system control and/or diagnostic routines based on the DEF operating parameters from FIG. 4. For example the controller may monitor and control DEF injection timing and pulsewidth, power to the DEF pump, and power to the DEF line heater based on the input information, such as DEF tank location, wheelbase, and/or others.

In one example, the routine may provide for longer injection pulsewidths for an increased DEF delivery line length, to account for increased flow resistance. In another example, the routine may provide higher pump voltage for an increased DEF delivery line length, to account for increased flow resistance. In still another example, the routine may adjust the heater power, current, duty cycle, etc., to account for variations in the heater resistances.

In this way, it is possible to enable flexible mounting locations for exhaust system components, such as DEF system components, while still providing accurate system diagnostics and system control.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle with a controller and an exhaust system including a reductant storage vessel, comprising:
   receiving by the controller, vehicle configuration information, indicative of positioning of the reductant storage vessel, from external to the vehicle;
   adjusting delivery of reductant to the exhaust system from the reductant storage vessel based on the received information.

2. The method of claim 1 further comprising adjusting controller calibration values based on the received information.

3. The method of claim 2 further comprising adjusting diagnostics of the exhaust system based on the received information.

4. The method of claim 1 wherein the adjusting includes adjusting a voltage delivered to a reductant delivery pump.

5. The method of claim 1 wherein the received information includes a code corresponding to a vehicle wheelbase.

6. A method for operating a vehicle with a controller and an exhaust system including a reductant storage vessel, comprising:
   receiving by the controller vehicle configuration information from external to the vehicle;
   adjusting delivery of reductant to the exhaust system from the reductant storage vessel based on the received information, wherein the exhaust system further includes a selective catalytic reduction emission control device, and wherein adjusting delivery of reductant from the reductant storage vessel to the exhaust system comprises adjusting delivery of reductant from the reductant storage vessel to the selective catalytic reduction emission control device, wherein the exhaust system includes a reductant line for delivering reductant from the reductant storage vessel to the selective catalytic reduction emission control device and a reductant line heater, the method further comprising determining a resistance of the reductant line heater based on a reductant line length, and wherein exhaust system operating parameters are adjusted based on the determined resistance.

7. The method of claim 6 wherein the determining includes increasing the determined resistance of the reductant line heater when the line length is increased from a default value.

8. The method of claim 6 wherein the determining includes decreasing the determined resistance of the reductant line heater when the line length is decreased from a default value.

9. The method of claim 6 wherein adjusting exhaust system operating parameters includes adjusting the reductant line heater.

10. The method of claim 1, wherein the vehicle is a partially-assembled vehicle.

11. The method of claim 1, wherein the received information includes a code corresponding to a relocation of the reductant storage vessel.

12. A method of configuring a controller of a vehicle with an exhaust system including a reductant storage vessel, comprising:
   receiving vehicle configuration information, indicative of vessel positioning, from external to the vehicle, the received information including a code corresponding to a relocation of the reductant storage vessel;
   adjusting delivery of reductant to the exhaust system from the reductant storage vessel to the exhaust system based on the received information; and
   adjusting controller calibration values based on the received information.

13. The method of claim 12 further comprising adjusting diagnostics of the exhaust system based on the received information.

14. The method of claim 13 wherein adjusting delivery of reductant includes adjusting a voltage delivered to a reductant delivery pump.

15. The method of claim 14, wherein the vehicle is a partially-assembled vehicle.

* * * * *